Patented May 20, 1952

2,597,645

UNITED STATES PATENT OFFICE 2,597,645

RUST INHIBITIVE LEAD PIGMENTS

Leonard M. Kebrich, Brooklyn, N. Y., assignor to National Lead Company, New York, N. Y., a corporation of New Jersey No Drawing. Application July 3, 1947,
Serial No. 759,001

4 Claims. (Cl. 106—298)

This invention relates to red lead pigments and particularly to compositions of red lead having superior pigment properties.

Red lead has long been considered a desirable pigment for use in paints for protection of ferrous articles. This pigment, as heretofore manufactured and known has consisted of predominantly "true red lead," $Pb_3O_4$, and has inevitably contained some percentage of free, uncombined lead monoxide, PbO. The percentage of free litharge in a pure grade of red lead is low, often of the order of a few per cent; however, this PbO content has been responsible for some undesirable characteristics. Thus, the PbO is often reactive with paint vehicles causing storage difficulties and in addition, when the paint is exposed to the weather, the PbO tends to form lead carbonate resulting in early loss of gloss, formation of a white surface film which destroys the original color, and which also may initiate premature breakdown of the film. The prior art has therefore attempted to provide superior red lead pigments by providing as high a true red lead content as possible, e. g. containing 97% or even slightly higher $Pb_3O_4$ content. Such a high $Pb_3O_4$ content is obtained by prolonged furnacing of PbO, and economic factors mitigate against production of much purer grades.

It is therefore, the principal object of this invention to provide a red lead composition containing substantially no uncombined or free litharge PbO. It is a further object to provide a red lead composition having superior pigment properties. Another object of the invention is to provide red lead composition suitable for use as a pigment which contains a lower $Pb_3O_4$ content than has heretofore been considered desirable. It is still another object to provide a novel and economical method for manufacturing the unique red lead compositions of this invention.

This invention in its broadest aspect contemplates the production of a litharge free red lead composition by treating red lead, as commercially manufactured, with chromic acid, so that the free litharge originally present in the red lead is converted to lead chromate. This is accomplished by making a suspension, or slurry of the red lead with water and slowly adding thereto with agitation, a solution of chromic acid. Under these conditions, the litharge in the red lead may be converted to either normal or basic lead chromate depending on the proportionate amounts of chromic acid added and the amount of free litharge present. If it is desired to obtain a faster reaction, a small amount of a solution-forming catalyst such as acetic or nitric acid may be added; however, adequate reaction speed may be obtained even at normal room temperature without its use. If no acid catalyst is used, the product may be simply filtered and dried, without washing, as is well known to the art.

It is important that the chromic acid solution be added slowly so that no large excess of chromate ions is at any time present in the reacting solution. The reaction temperature is not critical, normal room temperature gives good results, however, higher temperatures, up to about 80° C. may be used to accelerate the reaction speed. Under these conditions, it will be found that the free litharge alone combines to form lead chromate, the red lead itself being unaffected. Also, substantially all the free litharge in the red lead can be so converted, resulting in a substantially litharge free product.

The following examples will serve to illustrate the preparation of the pure chromated red lead products of this invention.

EXAMPLE I

Monobasic chromated red lead 2,400 grams of red lead containing 76.36% true red lead were agitated with 12 liters of water at room temperature in a suitable vessel. 127.1 grams of chromic acid dissolved in 1.1 liters of water were slowly dropped into the suspension over a 5 hour period. The product was filtered and dried at 80° C. The dried product had a deep orange color and on analysis was found to contain 71.82% red lead $Pb_3O_4$, and 28.18% monobasic lead chromate, $PbO.PbCrO_4$. An aqueous extract of this product had a pH value of 7.0 and a microscopic examination of the product revealed that the basic lead chromate was in an extremely fine condition, and intimately dispersed throughout the larger red lead particles. The specific gravity of this product was found to be 8.21.

EXAMPLE II

Normal chromated red lead 2,400 grams of red lead containing 75% true red lead were agitated with 12 liters of water at room temperature in a suitable vessel. 268.7 grams of chromic acid dissolved in 2.4 liters of water were slowly dropped into the suspension over a 5 hour period. The product was filtered and dried at 80° C. and on analysis was found to contain 67.4% red lead and 32.6% normal lead chromate, $PbCrO_4$. An aqueous extract had a pH value of 6.5 and microscopic examination showed that the lead chromate was in an extremely fine condition and well dispersed. The specific gravity of this product was found to be 7.7.

The above examples illustrate the methods of converting the free PbO content of red lead into either basic or normal lead chromate. For use as a rust inhibitive pigment the basic chromate compounds are generally preferred; however, the normal lead chromate has a distinctive yellow color which may be more desirable for certain applications. Also, an amount of chromic acid which will result in a mixture of normal and basic lead chromates may be used if desired.

By starting with commercial red lead, it is possible to produce by the method of this invention a rust inhibitive pigment substantially free from uncombined litharge; this pigment comprising a red lead composition containing lead chromate. The lead chromate portion of this mixture has of itself valuable rust inhibitive properties and its incorporation into the red lead composition enhances the properties of the original red lead. The same effect cannot be obtained by simply mixing red lead and lead chromate, for under these conditions, the free litharge already present in the red lead will not have been eliminated. It is also apparent that lower grades of red lead, that is those containing a substantial portion of uncombined lead monoxide, which are much more economical to produce in view of the fact that they are considerably easier to manufacture, may be used as the raw material for the production of this invention, and while as low as 50 per cent $Pb_3O_4$ red lead may easily be converted into valuable rust inhibitive pigments. A 75% or 85% red lead is sufficiently economical to produce and may be preferred for general use.

Chromated red leads according to this invention may be made into paint in any manner well known to the art. To illustrate the superior properties of paint made from the product of this invention, the following gives results of painting and exposure tests. The following pigments, for comparison, were made into conventional type paints using proper and equivalent amounts of ordinary linseed oil paint vehicles;

(1) Red lead (97% $Pb_3O_4$ grade).
(2) Basic lead chromate.
(3) Chromated red lead, according to this invention, made from 75% grade red lead.

The paints made from these pigments are tested by painting steel panels and exposing these simultaneously to actual weathering conditions. Such exposure tests take a long time to finally evaluate, but after 136 days of exposure, both the red lead and the basic lead chromate paints showed the presence of a carbonate film while the chromated red lead paint showed no change in color or appearance. The initial formation of the carbonate film on the red lead and basic lead chromate paints would tend to indicate a definitely shorter total life than from the chromated red lead paint which apparently was thus far unaffected.

The chromated red lead pigment according to this invention has numerous important advantages over conventional red lead. A lower grade red lead may be used in this invention in the production of a high grade rust inhibitive paint at considerable manufacturing economy. The keeping qualities of paints made with the product of this invention are good and the paints may be kept in storage for a long period without deterioration and hardening in the container. Chromated lead as herein described is compatible with substantially all common paint vehicles, and with many natural and synthetic resins. Due to the presence of lead chromate in the red lead composition, the rust inhibitive properties are distinctly enhanced. The gloss retention and color fastness of paints made with the chromated red lead of this invention as the pigment phase are definitely superior to either red lead or basic lead chromate when used alone. The use of the product of this invention eliminates substantially all the disadvantages resulting from the presence of free, uncombined lead monoxide, PbO, in red lead as previously used.

It is to be understood by those skilled in the art that various proportions of red lead and lead chromate may be obtained by varying the grade of red lead used and the amount of chromic acid or chromate salt added thereto. This invention is not limited to any definite proportion of red lead and lead chromate, and, manufacturing economics may dictate the most desirable proportion for commercial use.

I claim:

1. A process for manufacturing a litharge free red lead composition which comprises forming a water slurry of red lead containing free PbO and slowly adding to said slurry chromic acid in amount to convert said free PbO to lead chromate and filtering and drying the product.

2. A process for manufacturing a litharge free red lead composition which comprises forming a water slurry of red lead containing free PbO and slowly adding to said slurry chromic acid in amount to convert said free PbO to normal lead chromate and filtering and drying the product.

3. A process for manufacturing a litharge free red lead composition which comprises forming a water slurry of red lead containing free PbO and slowly adding to said slurry chromic acid in amount to convert said free PbO to basic lead chromate and filtering and drying the product.

4. A process for manufacturing a litharge free red lead composition which comprises forming a water slurry of red lead containing a substantial portion of free PbO and slowly adding to said slurry chromic acid in amount to convert said free PbO to lead chromate and filtering and drying the product.

LEONARD M. KEBRICH.

REFERENCES CITED

The following references are of record in the file of this patent:

UNITED STATES PATENTS

| Number | Name | Date |
|---|---|---|
| 987,965 | Cushman | Mar. 28, 1911 |
| 2,044,244 | Harshaw | June 16, 1936 |